UNITED STATES PATENT OFFICE.

FILIP KAČER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

COMPOUND OF THE ANTHRACENE SERIES AND PROCESS OF MAKING SAME.

No. 925,917.     Specification of Letters Patent.     Patented June 22, 1909.

Application filed March 2, 1908. Serial No. 418,850.

*To all whom it may concern:*

Be it known that I, FILIP KAČER, doctor of philosophy and chemist, subject of the King of Prussia, residing at Mannheim, Germany, have invented new and useful Improvements in Compounds of the Anthracene Series and Processes of Making the Same, of which the following is a specification.

I have discovered that by reacting with an acid chlorid (such for instance as phosphorus oxychlorid, phosphorus penta-chlorid and sulfuryl chlorid) on an acetylated amido-anthra-quinone compound I can obtain valuable condensation products. For the purposes of my invention either a monoacetyl or a diacetyl amido-anthraquinone compound, or an acetylated diamido-anthraquinone compound, or a mixture of any two, or more, of these compounds can be employed. Instead of any one, or more, of the above mentioned compounds, its, or their, halogen derivative, or derivatives, can be employed. The results obtained during the reaction depend upon the acetylamido-anthraquinone compound employed. Most of them dye cotton from the vat shades which vary in color and intensity. The products obtained should preferably be dyed while using less caustic soda and a lower temperature than usual and also with the addition of some Glauber's salt to the vat, 1-acetylamido-anthraquinone yielding a product which dyes cotton reddish brown, whereas by employing a mixture of 1-acetylamido-anthraquinone with 2-acetylamido-anthraquinone a yellow vat dyestuff is obtained. By reacting with phosphorus oxychlorid on the acetyl compound of the diamidoanthraquinone obtainable by reducing the easily soluble alpha-dinitro-anthraquinone described in the specification of German Patent No. 72,685 a brown vat dyestuff is obtained, but by employing a mixture of this acetyl compound with 1-acetyl-amidoanthraquinone, or with 2-acetyl-amidoanthraquinone, products are obtained which respectively dye cotton orange-red and yellow shades.

The acetylation of the amido-anthraquinone compound and the treatment with the acid chlorid can be made to take place in one operation; for instance, by heating the amido-anthraquinone compound with phosphorus oxychlorid, or phosphorus penta-chlorid, and acetic anhydrid, or acetyl chlorid, or sodium acetate, the new condensation products are directly obtained. If sulfuryl chlorid be employed as the acid chlorid, chlorination of the anthraquinone residue can also be effected in one operation.

The compounds obtained according to my invention possess weak basic properties and have a light brown to red color. They are insoluble in water and in dilute acids and alkalies, and are difficultly soluble in most organic solvents. In sulfuric acid they yield red solutions. They differ from the acetyl-amido - anthraquinone compounds from which they have been prepared in that they are not reconverted into the amido-anthraquinone compounds on treating them with saponifying agents, such for instance as sulfuric acid at a temperature of from 70° to 80° C. Most of the compounds are themselves coloring matters and some can be used for the preparation of coloring matters.

The following examples will serve to illustrate further the nature of my invention and how it can be carried into practical effect, but the invention is not confined to these examples. The parts are by weight.

Example 1: Boil together in a reflux apparatus one (1) part of 1-acetyl-amido-anthraquinone and two (2) parts of phosphorus oxychlorid until the solution which is at first formed is converted into a yellow crystalline mass. Then dissolve the melt in from eight (8), to ten (10), parts of concentrated sulfuric acid and allow the clear red solution to run slowly, while stirring, into one hundred (100) parts of water and then filter off, wash and dry the precipitate, which is then in the condition of a red powder.

Example 2: Boil together, for about ten (10) minutes, in a reflux apparatus, one (1) part of 2-acetyl-amido-anthraquinone and two (2) parts of phosphorus oxychlorid and work up as described in the foregoing Example 1. The product is a light brown powder which, in sulfuric acid, yields a red solution with a violet tinge.

Example 3: Boil together, for about ten (10) minutes, in a reflux apparatus, one (1) part of 1-acetyl-amido-anthraquinone, one (1) part of 2-acetyl-amido-anthraquinone and four (4) parts of phosphorus oxychlorid. The product obtained is, when dry, a light brown powder which yields a red solution in sulfuric acid.

Example 4: Boil together, for about ten (10) minutes, in a reflux apparatus, three hundred and thirty-four (334) parts of phosphorus oxychlorid, sixty-seven (67) parts of 1-acetyl-amido-anthraquinone and one hundred (100) parts of diacetyl-amido-anthraquinone (obtainable by reducing and then acetylating the alpha-dinitro-anthraquinone described in the specification of German Patent 72,685). The product obtained is a red-brown powder which yields a red solution in sulfuric acid and dyes cotton, from a hydrosulfite vat, orange-red shades.

Example 5: Heat together, for about three (3) hours, at a temperature of from seventy (70), to eighty (80), degrees centigrade, one hundred (100) parts of 2.4-dibrom-1-amido-anthraquinone, one hundred (100) parts of phosphorus oxychlorid and thirteen and a half (13.5) parts of acetic anhydrid, and then work up as described in the foregoing Example 1. The product obtained is a brown powder.

Example 6: Warm together gently, for about one (1) hour, in a reflux apparatus, one (1) part of 1-amido-anthraquinone and four (4) parts of sulfuryl chlorid. A homogeneous crystalline magma containing an excess of sulfuryl chlorid is thus obtained. Then add one (1) part of acetic anhydrid and heat until solution is effected. On working up the product as described in the foregoing Example 1, a yellow-brown powder is obtained.

Now what I claim is:

1. The process of producing compounds of the anthracene series by reacting with an acid chlorid on an acetylated amidoanthraquinone compound.

2. The process of producing compounds of the anthracene series by reacting with an acid chlorid on a mixture of a plurality of acetylated amidoanthraquinone compounds.

3. The process of producing compounds of the anthracene series by reacting on an amidoanthraquinone compound with an acid chlorid and with an acetylating agent.

4. The process of producing compounds of the anthracene series by reacting on a mixture of a plurality of amidoanthraquinone compounds with an acid chlorid and with an acetylating agent.

5. As new articles of manufacture the compounds of the anthracene series which can be obtained by reacting with an acid chlorid on an acetylated amidoanthraquinone compound, which new compounds possess weak basic properties and have a light brown to red color, are insoluble in water and in dilute acids and alkalies and are difficultly soluble in most organic solvents, but yield red solutions in concentrated sulfuric acid and remain unaltered on being heated with sulfuric acid at a temperature of 70° C.

6. As a new article of manufacture the coloring matter of the anthracene series which can be obtained by reacting with phosphorus oxychlorid on a mixture of 1-acetylamido-anthraquinone and diacetyldiamidoanthraquinone which coloring matter possesses weak basic properties and in the form of powder possesses a red-brown color and is insoluble in water and in dilute acids and alkalies and is difficultly soluble in most organic solvents but yields a red solution in concentrated sulfuric acid and remains unaltered on being heated with sulfuric acid at a temperature of 70° C. and which dyes cotton from a hydrosulfite vat orange-red shades.

In testimony whereof I have hereunto set my hand in the presence of two subscribing witnesses.

FILIP KAČER.

Witnesses:
J. ALEC. LLOYD,
JOS. H. LEUTE.